United States Patent
Coffing

(10) Patent No.: US 10,999,067 B2
(45) Date of Patent: May 4, 2021

(54) DATA STREAM IDENTITY

(71) Applicant: Syntegrity Networks Inc., Seattle, WA (US)

(72) Inventor: Nathanael Coffing, Seattle, WA (US)

(73) Assignee: CLOUDENTITY, INC., Seattle, WA (US)

( * ) Notice: Subject to any disclaimer, the term of this patent is extended or adjusted under 35 U.S.C. 154(b) by 0 days.

(21) Appl. No.: 16/459,373

(22) Filed: Jul. 1, 2019

(65) Prior Publication Data

US 2020/0014532 A1    Jan. 9, 2020

Related U.S. Application Data

(60) Provisional application No. 62/692,371, filed on Jun. 29, 2018.

(51) Int. Cl.
```
H04L 9/08      (2006.01)
H04L 9/32      (2006.01)
H04L 29/06     (2006.01)
H04L 9/00      (2006.01)
```
(52) U.S. Cl.
CPC ............ *H04L 9/0847* (2013.01); *H04L 9/006* (2013.01); *H04L 9/0836* (2013.01); *H04L 9/3265* (2013.01); *H04L 63/0442* (2013.01); *H04L 63/06* (2013.01)

(58) Field of Classification Search
CPC ..... H04L 9/0847; H04L 9/006; H04L 9/0836; H04L 63/06; H04L 63/0442
See application file for complete search history.

(56) References Cited

U.S. PATENT DOCUMENTS

| | | | |
|---|---|---|---|
| 8,990,574 B1* | 3/2015 | Priyadarshi | H04L 63/0823 713/176 |
| 2005/0025316 A1* | 2/2005 | Pelly | H04N 5/913 380/277 |
| 2006/0195886 A1 | 8/2006 | Ashley | |
| 2007/0150934 A1 | 6/2007 | Fiszman et al. | |
| 2008/0010458 A1* | 1/2008 | Holtzman | H04L 63/0823 713/175 |

(Continued)

FOREIGN PATENT DOCUMENTS

| WO | WO 2020/006572 | 1/2020 |
|---|---|---|
| WO | WO 2020/006573 | 1/2020 |

OTHER PUBLICATIONS

PCT Application No. PCT/US2019/040202 International Search Report and Written Opinion dated Dec. 13, 2019.

(Continued)

*Primary Examiner* — Samson B Lemma
*Assistant Examiner* — Zoha Piyadehghibi Tafaghodi
(74) *Attorney, Agent, or Firm* — Polsinelli LLP

(57) ABSTRACT

Systems and methods for managing data stream identity are provided. Ownership information regarding a data stream may be analyzed to identify at least one owner. The data stream may be filtered to identify at least one portion that is associated with the identified owner. A unique identifier may be assigned to the identified portion. The identified portion may be stored in memory in association with the assigned unique identifier and information regarding the identified owner. Access to the identified portion may be controlled based on settings set by the identified owner.

19 Claims, 3 Drawing Sheets

(56) References Cited

U.S. PATENT DOCUMENTS

| | | |
|---|---|---|
| 2008/0255928 A1 | 10/2008 | Tomeny |
| 2009/0070266 A1 | 3/2009 | Shah et al. |
| 2009/0210886 A1 | 8/2009 | Bhojwani et al. |
| 2010/0100737 A1 | 4/2010 | Chapman |
| 2010/0138652 A1* | 6/2010 | Sela ................. G06F 21/445 <br> 713/158 |
| 2010/0192024 A1 | 7/2010 | Middleton et al. |
| 2011/0055563 A1* | 3/2011 | Chandran ........... H04L 63/0428 <br> 713/168 |
| 2014/0164776 A1* | 6/2014 | Hook ................. H04L 9/14 <br> 713/171 |
| 2015/0049914 A1 | 2/2015 | Alves |
| 2015/0347542 A1 | 12/2015 | Sullivan et al. |
| 2018/0211115 A1* | 7/2018 | Klein ................. G08B 25/10 |
| 2018/0287789 A1* | 10/2018 | Sridharan ............. H04L 63/064 |
| 2019/0392318 A1 | 12/2019 | Ghafoor et al. |
| 2020/0013060 A1 | 1/2020 | Coffing |

OTHER PUBLICATIONS

PCT Application No. PCT/US2019/040204 International Search Report and Written Opinion dated Dec. 11, 2019.
U.S. Appl. No. 16/459,375 Office Action dated Oct. 14, 2020.
U.S. Appl. No. 16/459,375 Final Office Action dated Feb. 25, 2021.

* cited by examiner

200

DATA STREAM IDENTITY

CROSS-REFERENCE TO RELATED APPLICATIONS

The present patent application claims the priority benefit of U.S. provisional patent application No. 62/692,371 filed Jun. 29, 2018, the disclosure of which is incorporated by reference herein.

BACKGROUND OF THE INVENTION

1. Field of the Invention

The present invention generally relates to data stream management. More specifically, the present invention relates to managing identities assigned to data streams.

2. Description of the Related Art

Multiple different entities may be involved in different capacities as to the content of data streams. For example, different entities may be involved in the generation of the data, other contribution of data, analysis of the data, distribution of the data, consumption of the data, etc. As such, each entity may be associated with different portions of a data stream, as well as entitled to different rights to such portions. Each entity may be associated with different policies and requirements that such entity may wish to apply to their respective portions.

For example, a video stream may involve entities associated with the camera that captured the video, entities associated with the processing software (e.g., facial recognition) applied to the video, entities that appear in or are associated with images in the video, distributors of the video, and consumers or other recipients of the video.

There is currently no way, however, of associating a data stream (or defining specific segments therein) with entity-specific data of multiple entities with such granularity. For example, specific segments of the video may be associated with different entities, and such segments may overlap to different extents. No presently known system is capable of defining entity-specific segments within a single data stream for multiple different entities, associating such segments with respective entities, nor applying multiple different authorization requirements to different segments (some of which may overlap to different extents) of the same data stream.

There is, therefore, a need in the art for systems and methods of assigning, identifying, and managing identities associated with data streams.

SUMMARY OF THE CLAIMED INVENTION

Embodiments of the present invention allow for data sets to assume their own identity with individual requirements for lifecycle and access control management attached. In particular, individual data sets may be associated with a unique identifier. A data stream may be broken down, for example, into multiple data segments, which may be part of a data set. Such data set may not necessarily be contiguous. For example, an individual may appear, then disappear, then reappear in a video at different points in time. Such individual may further appear in only a small portion of each image frame. As such, that individual may be associated with a data set comprising the respective portions in which he or she appears at the different points in time.

Various embodiments may include methods for managing data stream identity. Such methods may include analyzing ownership information regarding a data stream to identify at least one owner, filtering the data stream to identify at least one portion that is associated with the identified owner, assigning a unique identifier to the identified portion, storing the identified portion in memory in association with the assigned unique identifier and information regarding the identified owner, and controlling access to the identified portion based on settings set by the identified owner.

Further embodiments may include systems for managing data stream identity. Such systems may include a communication interface that receives a data stream over a communication network, as well as a processor that executes instructions for analyzing ownership information regarding a data stream to identify at least one owner, filtering the data stream to identify at least one portion that is associated with the identified owner, and assigning a unique identifier to the identified portion. Systems may further include memory that stores the identified portion in memory in association with the assigned unique identifier and information regarding the identified owner; and the processor may control access to the identified portion based on settings set by the identified owner.

Yet further embodiments may include non-transitory computer-readable storage media having embodied thereon programs that are executable to perform the methods described herein.

DETAILED DESCRIPTION

Embodiments of the present invention allow for data sets to assume their own identity with individual requirements for lifecycle and access control management attached. In particular, individual data sets may be associated with a unique identifier. A data stream may be broken down, for example, into multiple data segments, which may be part of a data set. Such data set may not necessarily be contiguous. For example, an individual may appear, then disappear, then reappear in a video at different points in time. Such individual may further appear in only a small portion of each image frame. As such, that individual may be associated with a data set comprising the respective portions in which he or she appears at the different points in time.

Figure 1:
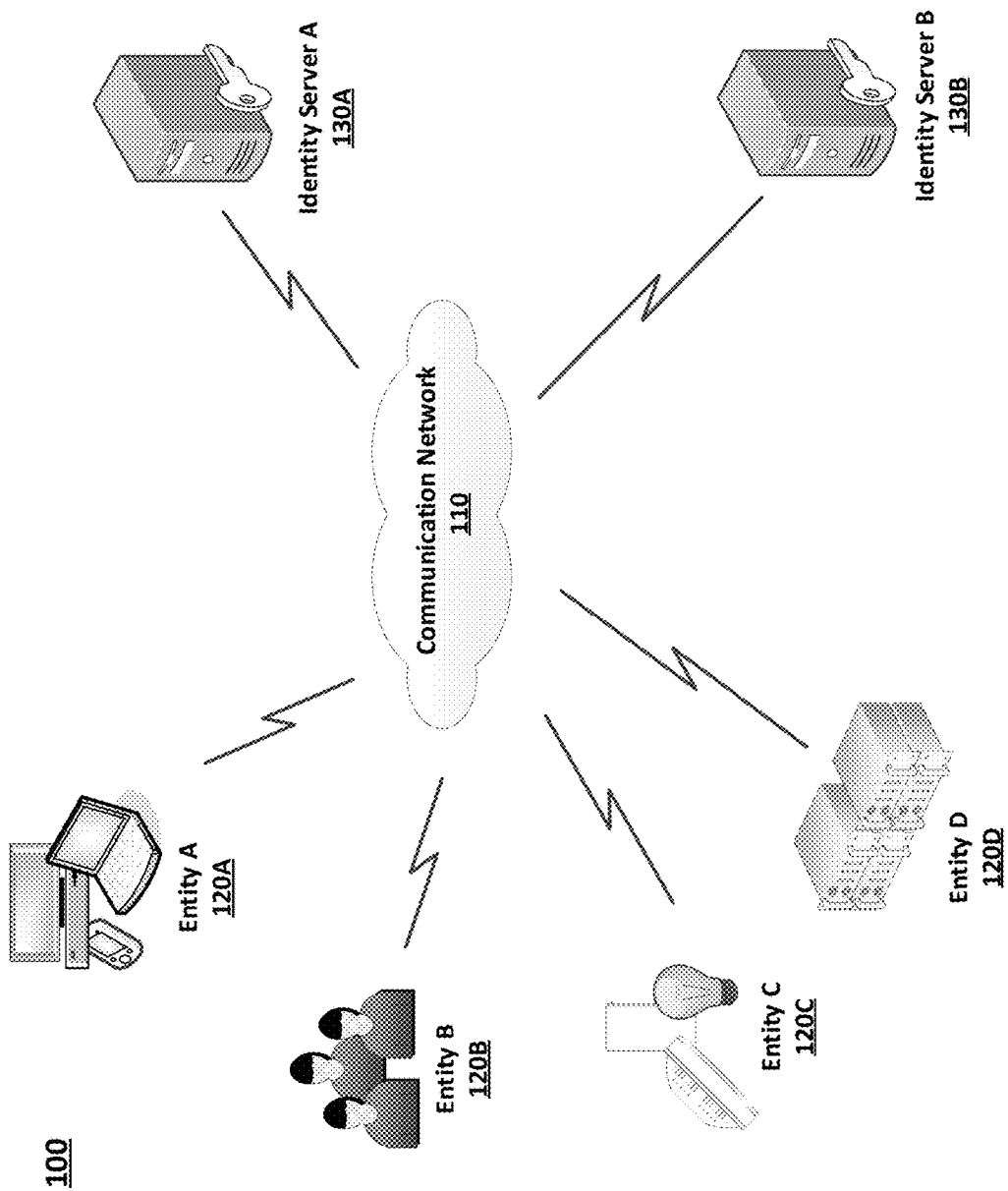
FIG. 1 illustrates a simplified network environment in which a system for managing data stream identity may be implemented.

FIG. 1 illustrates an exemplary network environment in which a system for managing data stream identity may be implemented. As illustrated, an exemplary network environment 100 may include a variety of different entities, including entity A 120A (e.g., personal user devices), entity B 120B (e.g., individual users), entity C 120C (e.g., Internet of Things (IoT) devices), and entity D 120D (e.g., services/server systems). Such entities 120A-D may communicate over one or more different types of communication networks 110 with one or more identity servers A 130A and B 130B.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, cellular or mobile service providers, a cable service provider, a provider of digital subscriber line (DSL) services, or a satellite service provider. Communications network 110 allows for communication between the various components of network environment 100.

In some instances, entities 120A-D may communicate with identity servers 130 over communication network 110 via an API gateway (not pictured). Such an API gateway may serve as an entry point for an entity 120 to a service mesh. API gateway may expose public endpoints for identification and authentication, as well as inject into a data stream contextual data (e.g., via a token to proxied requests signed using a private key issued exclusively for the API gateway (e.g., by an internal certificate authority in a security plane)). API gateway can enforce rich policies that can be created in identity server 130 (e.g., based on such factors as user attributes, roles, relationships, session attributes, current location, device information, authentication methods used, and risk factor of a transaction user or a device).

Entities 120A-D may use or be embodied in any number of different electronic devices, such as general purpose computers, mobile phones, smartphones, smartwatches, wearable devices, personal digital assistants (PDAs), portable computing devices (e.g., laptop, netbook, tablets), desktop computing devices, handheld computing device, smart sensors, smart appliances, IoT devices, devices networked to controllers for smart control, servers and server systems (including cloud-based servers and server systems), or any other type of computing device capable of communicating over communication network 110. Such devices associated with entities 120A-D may also be configured to access data from other storage media, such as local caches, memory cards, or disk drives as may be appropriate in the case of downloaded services. Devices associated with entities 120-A-D may include standard hardware computing components such as network and media interfaces, non-transitory computer-readable storage (memory), and processors for executing instructions that may be stored in memory.

Identity servers 130 may provide a platform for managing data stream identity. Identity server 130 may be installable in the cloud or on-premises. Such identity server 130 may also include a public key infrastructure (PKI) that allows for reading, generation, assignment, and management of digital certificates, security keys, and other encryption data. Identity server 130 may therefore uniquely associate each entity 120 with a set of identification data that allows for entity-specific identification, digital signature, and/or encryption. Entity-specific identity information may be generated by one or more identity servers 130, as well as other identity providers (e.g., Facebook, OAuth OpenID, biometric signatures).

Identity servers 130 may generate a private key (e.g., PKI-based key) that is unique to each identified specific entity 120, which allows the entity 120 to be identified and allows the entity 120 to manage its associated data portions or segments within a stream. In some instances, identity server 130 may issue a private key to an entity 120 upon registrations. Otherwise, identity server 130 may identify a new entity 120 that has not registered and issue a placeholder or nonce key to the identified new entity 120. Upon registration or attestation at a later point in time, the nonce key may be correlated with the identified new entity 120. The key issued by the identity server 130 allows the entity 120 to secure (e.g., encrypt or digitally sign) data portions within the stream with which the entity 120 is associated. As such, each entity 120 may have data-field level control over access to its respective data portions. In some instances, entity-specific identity data may be used to sign authorization policies that may then be packaged with the data stream. As such, if another wishes to access a data portion associated with a specific entity 120, such access may be governed by the authorization policies of the specific entity 120. Such authorization policies may govern various conditions under which the data portion is allowed to be accessed, for example, when the data portion may be access, how such data portion may be access, etc.

As entities 120 communicate data to each other, data may be added to a data stream that is associated with one or more entities 120. Different data segments of a data stream may be associated with a different set of entities 120. Each data portion may therefore be associated with different sets pf authorization policies. By breaking down such collections of data (e.g., a data stream) into data sets that can each be associated with unique identifiers, the different data sets may further be assigned to different entities 120. Each entity 120 may further exercise certain rights to their respective data set, which may also be subject to different policies and rules based on the entity 120 with which the data set is associated. Referring to the example above, an individual whose image appears in a video may be identified as an owner of the data set comprising the portions (including portions of each image frame) in which he or she appears. As such, the individual may choose to manipulate that data set (e.g., by blacking out, deleting, pixelating the respective portions) or restrict access permissions (e.g., remove from public view, restrict to identified individuals or groups). Moreover, the individual may live in certain jurisdictions with policies and rules that govern privacy rights, rights of publicity, and other rights. Such policies and rules may be applied, specifically to the data set.

A single data stream may therefore be associated with different owners assigned to the different data sets identified within the stream and assigned unique identifiers. Such identifier and ownership data may be stored in a database in association with the respective data sets in the data stream (e.g., a video). Ownership data may further reflect the location of the owner, as well as certain access and control rights specified by the set of authorization policies. Certain access and control settings specified by an owner may also be stored in association with the data set. An owner may further be given the authority to manage their respective data set, which may further be stored in an encrypted format. The respective encryption keys may then be shared with other individuals and groups authorized by the owner to access the underlying data set associated with the owner.

In some embodiments, the data stream itself may be treated holistically, allowing for association with multiple different encryption keys, different consent patterns, different ownership schemes, etc. based on the different data sets identified within the complete data stream.

The data stream may be processed by one or more identity servers 130, which may make use of various libraries to identify specific entities associated with the stream. For example, image libraries may be used to identify specific entities captured in a video stream. Some membership organizations or other associations, for example, may issue picture identification to its members or associates. Digital libraries that include such pictures may be used to identify when a member or associate is captured in a video stream. Conversely, identity server 130 (or a proxy) may also identify that an entity captured in the video is not a member or associate. As noted above, however, such non-member or non-associate may nevertheless be associated with a nonce key. The nonce key may later be correlated to the identity of the entity upon registration. The identity server 130 may therefore enforce the authorization policies associated with each data portion. Such enforcement may include granting or denying access, modifying the data stream (e.g., blur or pixelate an image of a specific entity), verifying authorization and conditions of the access, etc.

Figure 2:
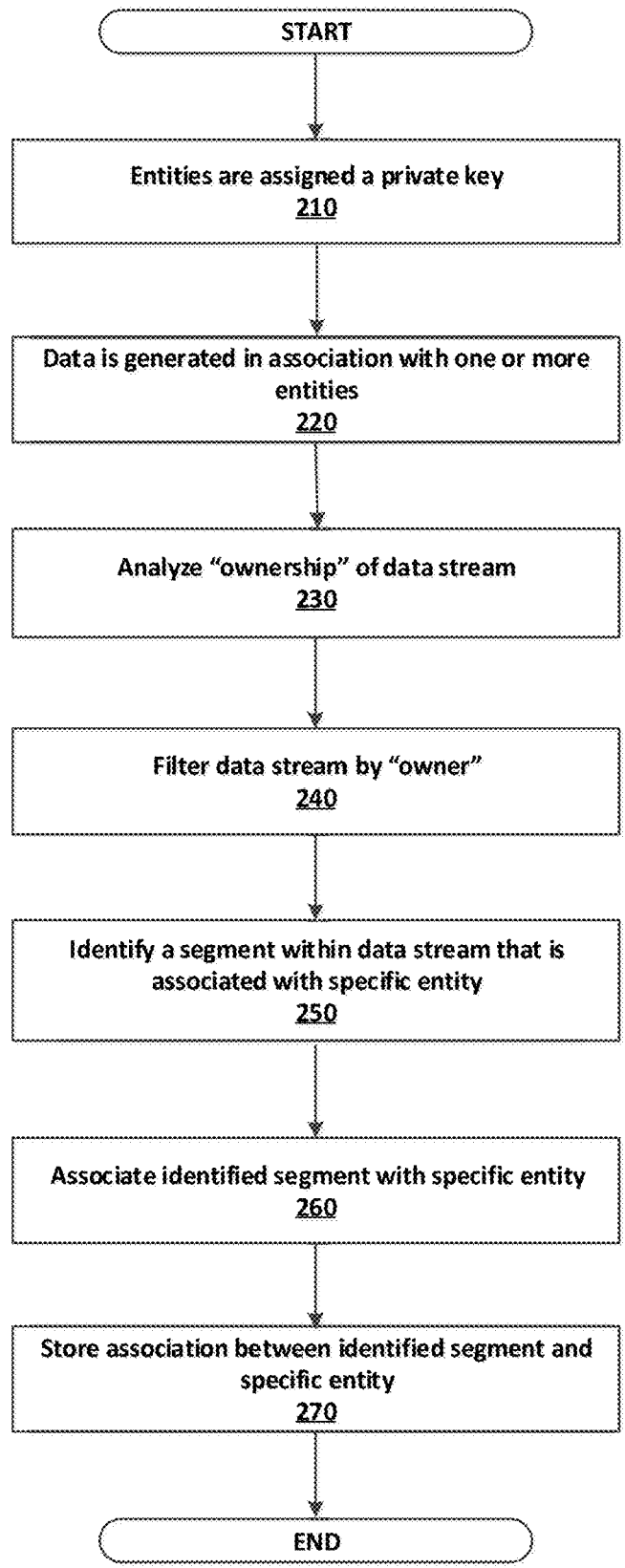
FIG. 2 is a flowchart illustrating an exemplary method for managing data stream identity.

FIG. 2 is a flowchart illustrating an exemplary method for managing data stream identity. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In step 210, an entity 120 is assigned a private key by identity server 130. Such assignment may occur upon registration with a particular identity server 130 or upon identification as a new entity by the identity server 130. Such private key may be stored and managed by identity server 130 or associated proxies.

In step 220, a data stream may be generated in associated with one or more entities 120. Such data generation may include digital communications, capture (e.g., in video or audio) on digital media, or other association. As noted above, each data stream and portions thereof may be associated with a different set of entities 120. A video stream, for example, may have segments respectively associated with no entities, one entity, or multiple different entities. The In step 230, identity server 130 may analyze ownership of the data stream. Such analysis may include use of various libraries to identify the presence or association of all entities associated with the data stream, whether known or unknown to the identity server 130.

In step 240 and 250, identity server 130 may filter the data stream by owner (e.g., each different recognized entity with in the data stream) to identify data segments associated with each entity. In step 260, the identified segment(s) may then be associated with the private key associated with the owner entity, and in step 270, the association may be stored in memory of identity server 130 for use in processing future requests related to the data segment(s).

Figure 3:
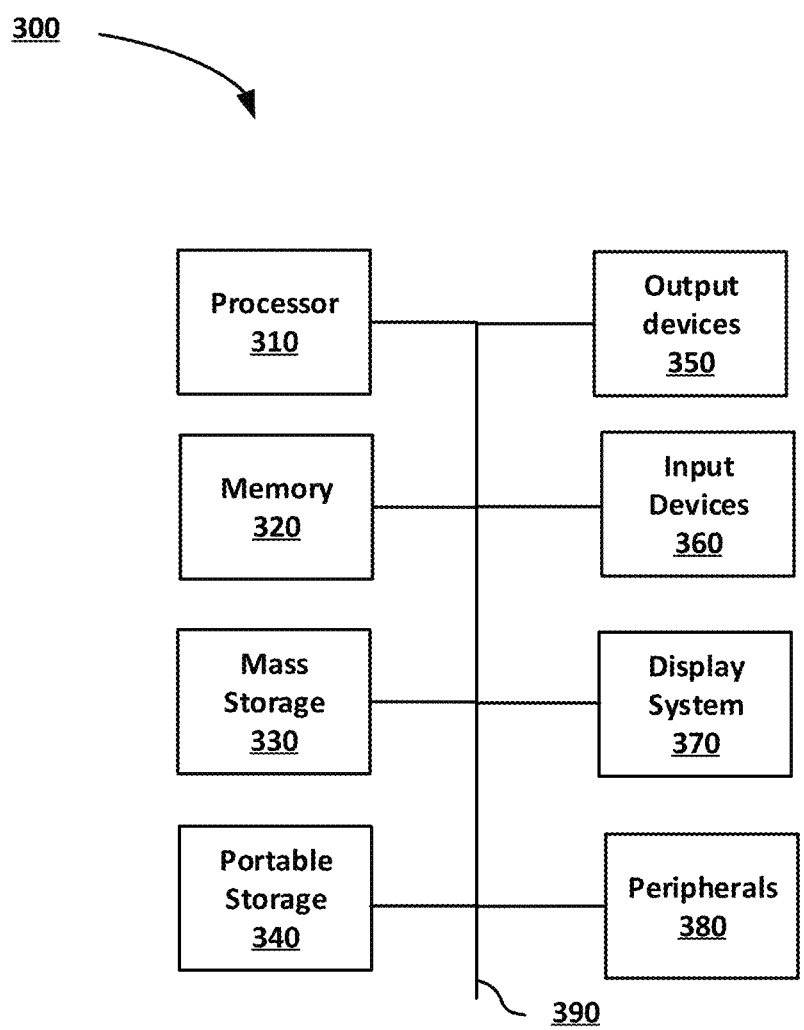
FIG. 3 illustrates an exemplary computing system that may be used to implement an embodiment of the present invention.

FIG. 3 illustrates an exemplary computing system 300 that may be used to implement an embodiment of the present invention. System 300 of FIG. 3 may be implemented in the contexts of the likes of entity A devices 120A, entity C 120C, or entity D 120D, as well as those used by used by entity B 120B. The computing system 300 of FIG. 3 includes one or more processors 310 and memory 310. Main memory 310 stores, in part, instructions and data for execution by processor 310. Main memory 310 can store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. However, the components may be connected through one or more data transport means. For example, processor unit 310 and main memory 310 may be connected via a local microprocessor bus 390, and the mass storage device 330, peripheral device(s) 380, portable storage device 340, and display system 370 may be connected via one or more input/output (I/O) buses 390.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 310.

Portable storage device 340 operates in conjunction with a portable non-volatile storage medium, such as a floppy disk, compact disk (CD) or digital video disc (DVD), to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. For example, peripheral device(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus (e.g., bus 390) carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for managing data stream identity, the method comprising:
    analyzing a data stream to identify ownership information within the data stream, wherein the ownership information includes an identified owner of the data stream, and wherein analyzing the data stream comprises comparing owner image data found within the data stream to an image database that includes image data of one or more known entities;
    filtering the data stream to identify at least one portion that is associated with the identified owner;
    assigning a unique identifier to the identified portion associated with the identified owner;
    storing the identified portion in memory in association with the assigned unique identifier and information regarding the identified owner; and
    controlling access to the identified portion based on settings set by the identified owner.

2. The method of claim 1, wherein the unique identifier is a private key.

3. The method of claim 2, wherein the private key is based on public key infrastructure (PKI).

4. The method of claim 2, wherein controlling access to the identified portion includes encrypting the identified portion.

5. The method of claim 1, further comprising generating the unique identifier.

6. The method of claim 5, further comprising registering the identified owner in association with entity identification information in memory, wherein the unique identifier is generated upon registration.

7. The method of claim 5, wherein the identified owner is not associated with entity identification information in memory, and wherein the unique identifier is a nonce identifier.

8. The method of claim 1, wherein the identified owner is associated with a plurality of different portions within the data stream.

9. The method of claim 1, wherein at least one portion associated with the identified owner is further associated with at least one other owner.

10. A system for managing data stream identity, the system comprising:
    a communication interface that receives a data stream over a communication network;
    a processor that executes instructions stored in memory, wherein execution of the instructions by the processor:
        analyzes a data stream to identify ownership information within the data stream, wherein the ownership information includes an identified owner of the data stream, and wherein analyzing the data stream comprises comparing owner image data found within the data stream to an image database that includes image data of one or more known entities,
        filters the data stream to identify at least one portion that is associated with the identified owner, and
        assigns a unique identifier to the identified portion associated with the identified owner; and
    memory that stores the identified portion in memory in association with the assigned unique identifier and information regarding the identified owner,
    wherein the processor controls access to the identified portion based on settings set by the identified owner.

11. The system of claim 10, wherein the unique identifier is a private key.

12. The system of claim 11, wherein the private key is based on public key infrastructure (PKI).

13. The system of claim 11, wherein the processor controls access to the identified portion by encrypting the identified portion.

14. The system of claim 10, wherein the processor further generates the unique identifier.

15. The system of claim 14, wherein the processor further registers the identified owner in association with entity identification information in memory, and wherein the unique identifier is generated upon registration.

16. The system of claim 14, wherein the identified owner is not associated with entity identification information in memory, and wherein the unique identifier is a nonce identifier.

17. The system of claim 10, wherein the identified owner is associated with a plurality of different portions within the data stream.

18. The system of claim 10, wherein at least one portion associated with the identified owner is further associated with at least one other owner.

19. A non-transitory computer-readable storage medium, having embodied thereon a program executable by a processor to perform a method for managing data stream identity, the method comprising:
    analyzing a data stream to identify ownership information within the data stream, wherein the ownership information includes an identified owner of the data stream, and wherein analyzing the data stream comprises comparing owner image data found within the data stream to an image database that includes image data of one or more known entities;
    filtering the data stream to identify at least one portion that is associated with the identified owner;
    assigning a unique identifier to the identified portion associated with the identified owner;
    storing the identified portion in memory in association with the assigned unique identifier and information regarding the identified owner; and controlling access to the identified portion based on settings set by the identified owner.

\* \* \* \* \*